United States Patent [19]

Fortune et al.

[11] Patent Number: 4,734,559
[45] Date of Patent: Mar. 29, 1988

[54] REMOTELY ELECTRONICALLY CONTROLLED SOLDERING INSTRUMENT

[76] Inventors: William S. Fortune, 29866 Cuthbert St., Malibu, Calif. 90265; Wayne A. Murray, 13117 Sierra Hwy., Saugus, Calif. 91350

[21] Appl. No.: 796,958

[22] Filed: Nov. 12, 1985

[51] Int. Cl.⁴ .......................... H05B 1/02; H05B 3/00; B23K 3/04

[52] U.S. Cl. .................................. 219/241; 219/227; 219/229; 219/238; 219/240; 228/51

[58] Field of Search ................. 219/227–230, 219/236–241, 501, 497, 533; 228/51–53

[56] References Cited

U.S. PATENT DOCUMENTS

| 3,136,878 | 6/1964 | Staller | 219/239 |
| 3,883,716 | 5/1975 | Fortune | 219/241 |
| 4,055,744 | 10/1977 | Fortune | 219/239 |
| 4,074,110 | 2/1978 | Slaughter | 219/240 |
| 4,507,546 | 3/1985 | Fortune et al. | 219/501 X |

FOREIGN PATENT DOCUMENTS 1165176  3/1964  Fed. Rep. of Germany ...... 219/236

Primary Examiner—Anthony Bartis
Attorney, Agent, or Firm—Daniel T. Anderson

[57] ABSTRACT

A hand held, electronically controlled soldering instrument in which the electronic control module is placed several feet along the power cord away from the tool utilizes the power cord leads to measure the resistance of the heater element during each inflection point of the AC input power. The resistance magnitude is used to provide a signal which is a function of the temperature of the heater element. This signal, in turn, is used to control the electric current to the heater element. This arrangement thermally isolates the heater element and the sensitive electronic control circuit and also removes the heat generating circuitry from the handle of the soldering tool. The handle is further cooled by minimizing the heat flow from the heater element to the handle and by using conductors in the power cord as heat sinks to remove heat from the base end of the heater element shaft. A skirt-collar element is placed over a major portion of the handle portion as a fastener element between the heater element shaft and the handle; and, because it is annularly spaced from the handle, it provides an especially cooled grip for the hand and fingers of the operator.

11 Claims, 5 Drawing Figures

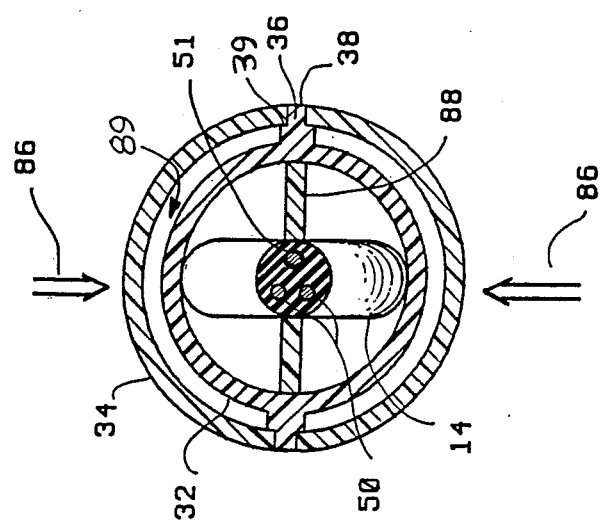
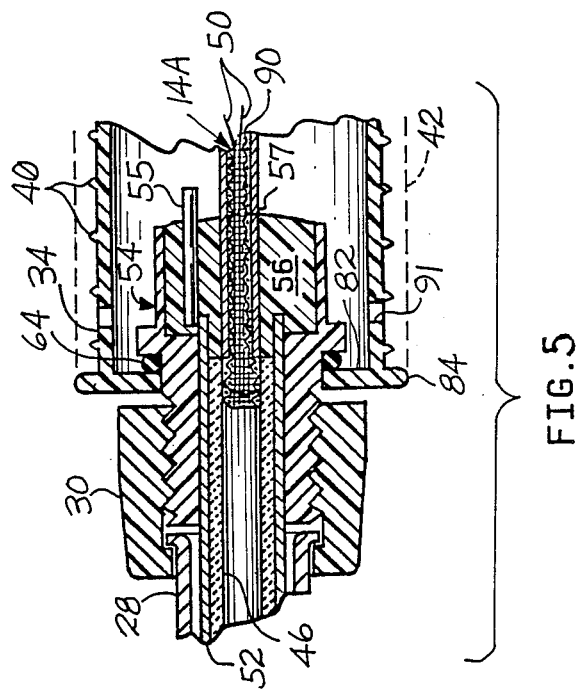

REMOTELY ELECTRONICALLY CONTROLLED SOLDERING INSTRUMENT

BACKGROUND OF THE INVENTION

This invention relates generally to hand held soldering instruments and more specifically to electronically controlled soldering irons whose tip temperature is sensed and controlled by electronic control means which is thermally isolated from the tip.

In the electronics field, both in production facilities as well as in laboratories for research, development or repair, it has become essential to have soldering and desoldering tools capable of providing precise soldering tip temperatures in order to minimize the risk of damage to thermally sensitive components affixed by the solder to other circuit elements. From non-controlled soldering irons, the art has developed through crude bimetalic strip controls to thermistor or thermocouple controlled instruments and more recently to tools electronically controlled by a circuit responsive remotely to the thermally dependent resistance of the heating element itself. This technique is described in U.S. Pat. No. 4,507,546, issued Mar. 26, 1985, to William S. Fortune and Wayne A. Murray. In essence, the power leads carrying the electric current through the soldering tip heater are used, for a very short period of each cycle during the inflection point of the applied alternating current, to effect a resistance measurement. This may be done to provide a signal which is a function of the temperature of the heater as often as every cycle while still impressing full wave power to the heater.

The best known prior art examples of electronically controlled soldering instruments employ sophisticated control circuitry housed within the handle of the soldering tool. Such instruments provide significant advantages over the previous art; however, they suffer limitations caused by the proximity of the electronic control components to the heating element, the difficulties of dissipating the heat generated by the control circuit itself, and the necessity of carrying the volume and mass of the control circuitry in the hand of the operator.

The difficulties of providing control circuit stability, accuracy, and component longevity in the environment of a heated soldering iron are obvious. It is also clear that such thermal problems are further aggravated by the heat generated by the control circuit itself and the difficulties of dissipating it away from the severly confined interior of the tool handle which, obviously, in addition to being reasonably cool must be kept as small and light as possible in order to be practical for long periods of operator use.

A further number of disadvantages include the relatively high cost of providing an instrument which successfully optimizes these problems with the advantages of a reliable and precise soldering tool. It may also be noted that a realistic item of cost is the vulnerability of the precision tool to damage from dropping or bumping it particularly since the electronics inherently are exposed to the risks of a hand tool fastened to the end of power cord likely to be inadvertently snagged or pulled.

Another limitation of prior art soldering tools is their size: irrespective of expense, the smallest available electronically controlled soldering instrument is too large and unwieldy for many otherwise desireably useful applications such as, for example, soldering or desoldering under a microscope or in other very confined workspaces.

Accordingly, it is an object of the present invention to provide an electronically precision controlled soldering instrument which does not suffer these and other disadvantages and limitations of the prior art.

It is another object to provide such a soldering instrument which is significantly lighter and smaller and less expensive than was heretofore available.

It is another object to provide such an instrument which is invulnerable to control circuitry damage due to soldering tip heater thermal effects or physical abuse to the hand held tool.

SUMMARY OF THE INVENTION

Briefly, these and other objects are achieved in a presently preferred example of the invention in which a hand held soldering instrument is provided having its electronic temperature control circuitry disposed remotely along its power cord at least several feet from the soldering tip, heating element, and handle. In this embodiment, the control circuitry is housed in a plug-in module at the AC power receptacle; and the module is supported on the receptacle by its three prong, grounded plug. The two power leads extending from the control module to the soldering instrument not only carry the full wave heating element power but are also used to effect repetitively a resistance measurement of the heating element. Accordingly, the hollow interior of the handle of the soldering instrument carries only the heater element terminals and a mechanical strain relief element for the power cord. The sensitive or heat generating control elements are all located remotely, in the control module.

A heating element assembly is provided which includes a hollow cylindrical ceramic tube carrying a deposited resistive heating element contiguously to its forward end and having a thin, low thermal conductivity metal protective envelope thereover. At its base end, opposite from the heating element, the assembly includes an enlarged diameter retaining shoulder, exposed forwardly, and a handle engaging shoulder exposed rearwardly. In assembly, the hollow handle carrying the power leads from the control module is placed near the base end of the heating element assembly; and the electrical terminals thereof are connected to the power lead ends. The hollow handle is then compressed axially against the handle engaging shoulder of the base end of the heating element assembly. To secure them together, an outer, forward handle skirt element is provided which consists of a hollow cylindrical portion having an inner diameter of the order of 8 to 10 percent larger than the outer diameter of the hollow handle. Its rear end is open and extends over a large portion of the forward part of the hollow handle. Its forward end is partially closed and is formed by an axially thin flange which extends radially outwardly to provide a support for the tool when it is laid on a bench top and to provide a finger rest and guard for the operator during use. The flange extends radially inwardly to approximately the outer diameter of the base end of the heating element assembly. The inner portion of the flange forms a collar to engage the forwardly exposed retaining shoulder of the heating element assembly. An elastomeric o-ring is disposed over the base end of the heating element assembly and is compressively retained between the flange and the retaining shoulder. The skirt element is concentrically spaced from the hollow handle to provide an additional thermal barrier between the heating element assembly and hollow handle, on the one hand, and the fingers of the operator on the other. Near the rear end of the skirt element, interlocking means between the hollow handle and the skirt element are provided whereby the skirt element is in tension between the o-ring and the interlocking means while the hollow handle and heating element assembly are correspondingly compressively secured together. The engagement of the hollow handle and the base end of the heating element is provided with interlocking means, such as to preclude relative angular displacement therebetween.

Thermal connection means is provided between the base end of the heating element assembly and a third conductor in the power cord leading to the control module. The third conductor may, for example, be a copper braid element. This connection aids further in removing any heat from the area of the handle engaged by the operator's fingers.

These and other features of the invention and their operation will be best understood from the following detailed description of examples of the invention presented in connection with the drawings.

THE DRAWINGS

FIG. 4, is a cross sectional view of the structure of FIG. 1 taken along the reference lines 4—4 thereof; and FIG. 5, is a longitudinal sectional view of a portion of another example of the invention.

DESCRIPTION OF A PREFERRED EMBODIMENT

Figure 1:
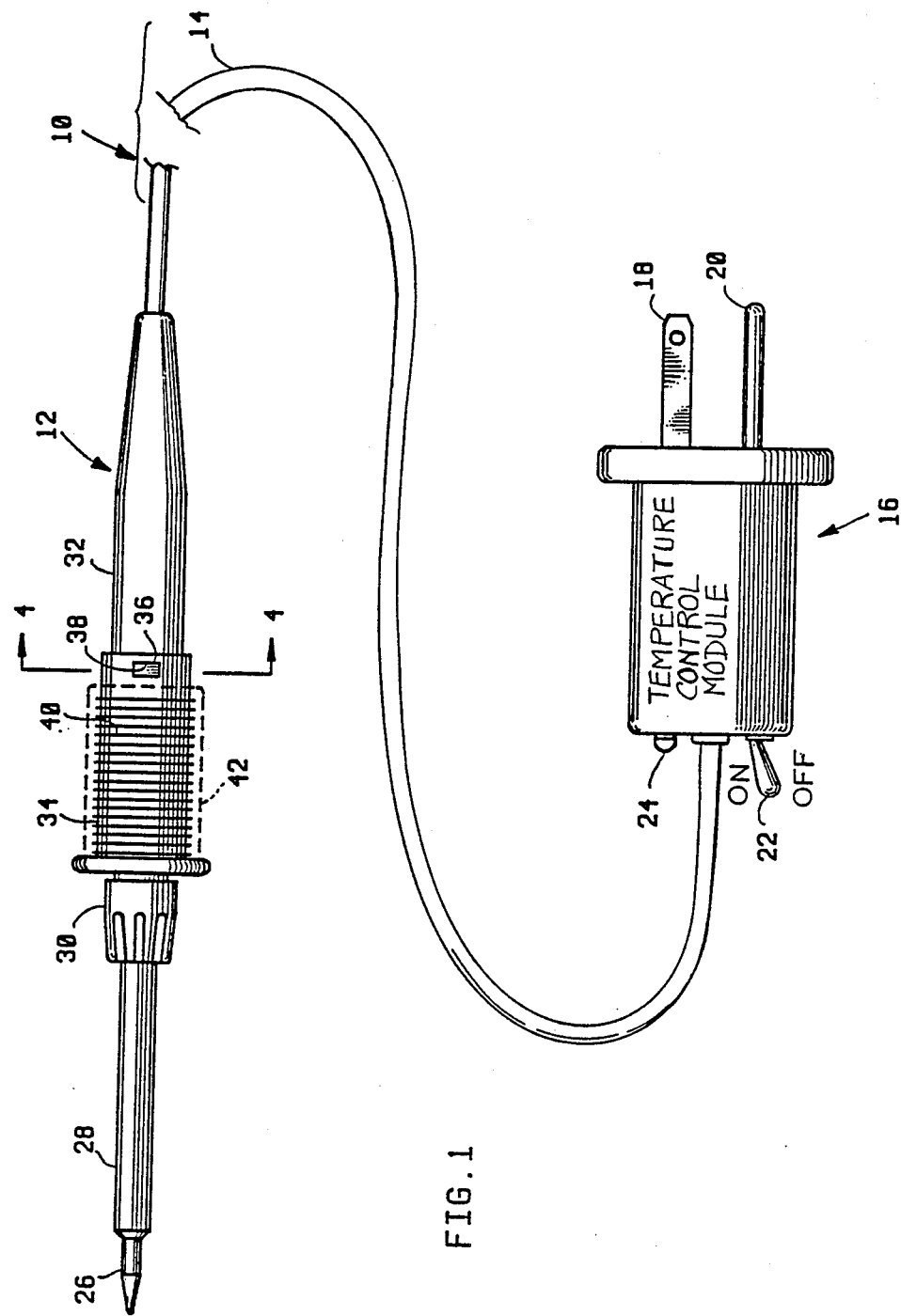
FIG. 1, is an elevational view of an example of a remotely electronically controlled soldering instrument embodying the principles of the present invention.

Referring to FIG. 1, the example shown includes an electronically temperature controlled soldering instrument combination 10 having a hand held soldering tool 12 connected by a power cord 14 to a remote control module 16 which, in this example, is of the character to be supported by having its power and grounding prongs 18, 20 inserted into an AC power receptacle (not shown). Again, as described above, the electronic control in the module 16 is preferably that disclosed in U.S. Pat. No. 4,407,546 and which senses remotely the thermally dependent resistance of the heating element to provide a control signal for the power supplied to the tool 12. The control module may include an on-off power switch 22 and a warning or pilot lamp 24.

It may be noted that although the module 16 is very compact, it nevertheless does not need to be as compact as would be required if it were to be confined within the hand held tool 12; and it need not suffer the limitations of the thermal environment of the soldering iron or add its own heat dissipation requirements thereto. In this connection, it should also be noted that the control module may even, when desired, include heat producing voltage reduction means such as a transformer so that the voltage in the power cord 14 may be 12 or 24 volts instead of 120 or 240 volts.

The hand held soldering tool 12 is seen to include a soldering tip 26 and a thin metal tubular retaining sheath 28 therefor which secures it by a nut 30 to the remainder of the heating element assembly as described below in connection with the discussion of FIG. 2. The heating element assembly is axially compressively secured to the hollow handle 32 by an outer forward handle skirt 34 as shown in FIG. 3. A pair of diametrically oppositely disposed retainer tabs 36 project radially outwardly from the hollow handle 32 and protrude removably into cooperating retaining slots 38 in the skirt 34 as shown on FIG. 4.

The outer forward handle skirt 34 is normally the part of the tool 12 which the operator engages with his fingers or hand; and while being cool for purposes of comfort and safety, it is made more comfortable by circular ridges 40 formed along the length of the outer surface of the handle skirt. In addition, an expanded plastic or foam collar 42 may be fitted snugly over the skirt for a more comfortable and secure grip while providing even greater thermal isolation between the operator's hand and the heated portion of the tool 12.

Figure 2:
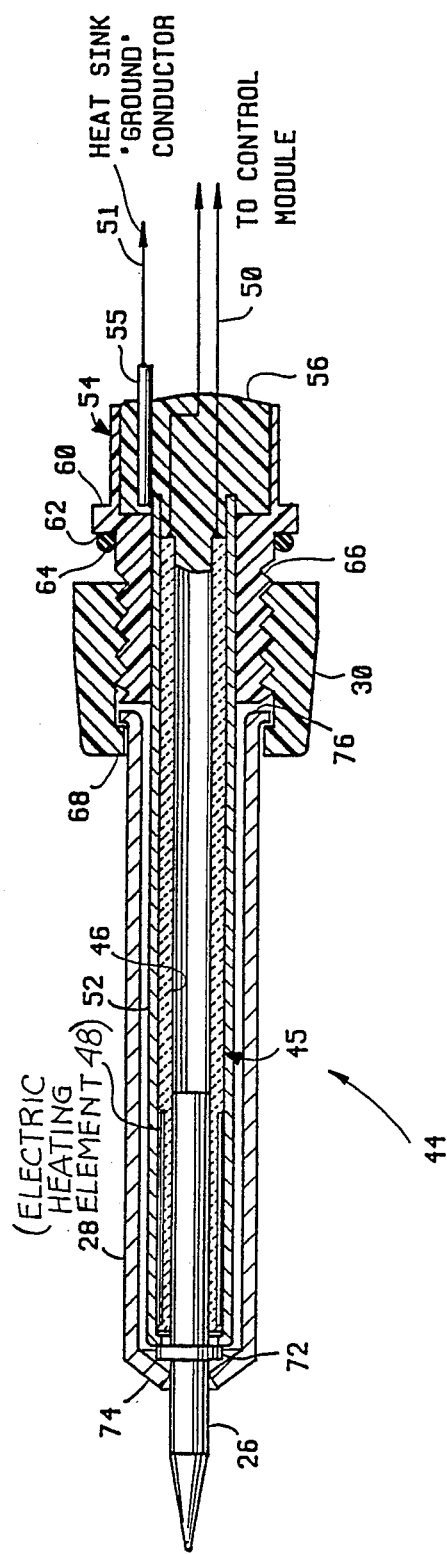
FIG. 2, is a longitudinal sectional view of the heating element assembly thereof.
Figure 3:
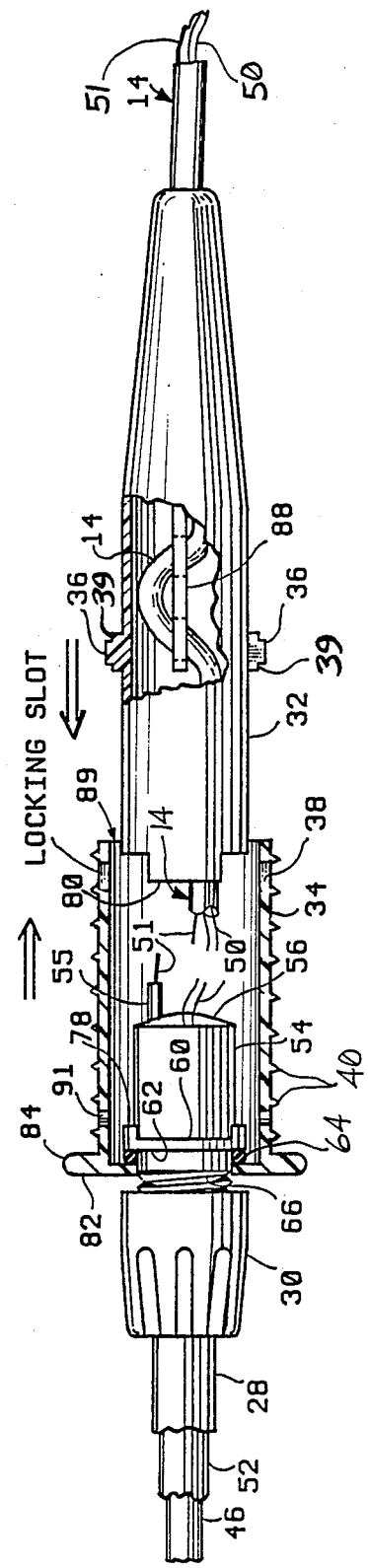
FIG. 3, is a partially exploded, partially sectioned view of the central portions of the apparatus of FIG. 1.

Referring to FIG. 2, the complete heating element assembly 44 is shown to include a ceramic heating element 45 which may that obtainable from Kyocera (model FM-95 for example) of Kyoto, Japan. As illustrated, it comprises a hollow cylindrical ceramic tube having a thin, resistive heating element 48 applied about its forward end portion just beneath its outer ceramic cylindrical surface. The electrical leads 50 for the heater are shown schematically connected to the rear of the ceramic tube 46 which may be encased in a thin metal shroud 52 preferably made of a material having relatively poor thermal conductivity.

A molded plastic bushing 54 is press fit snugly or moulded over the base end of the metal shroud 52 which has a thermally conductive stub 55 affixed thereto projecting well rearwardly of the bushing 54. A suitable potting resin 56 shown within the bushing seals and mechanically secures the heating element 45, the metallic shroud 48, and bushing 54 together. Thus the base end of the heating element assembly is the bushing 54 integrated with the ceramic tube 46 and metallic shroud 52 by the resin 56. The rear end of the bushing 54 is a cylindrical body 58 extending forwardly to an enlarged diameter rearwardly exposed retaining shoulder 60. The diameter is then reduced to form a forwardly exposed retaining shoulder 62 against which an elastomeric o-ring 64 is shown disposed. Forwardly of the retaining shoulder 62 and o-ring 64, the bushing 54 is provided with external tip retainer threads 66 over which the retainer nut 30 is shown. The nut 30 has a reduced diameter forward end which forms a sleeve retaining lip 68.

At the forward end of the heating element assembly 44, a soldering tip 26 is shown inserted into the hollow ceramic tube 46 contiguously to the heater element 48 and in snug thermal contact with the inner surface of the ceramic tube. The soldering tip 26 is, in this example, basically a cylindrical slug of iron coated copper having an enlarged diameter, short cylindrical retaining collar 72 which bears, on its rear surface, against the end of the ceramic tube 46 and its metal shroud 52 and, on its forward surface, against the inner front surface of the tip retaining sleeve 28. The sleeve 28 has a reduced diameter forward end 74 for engaging the collar 72 and has an enlarged diameter flange 76 at its rear end for engaging the sleeve retaining lip 68 of the nut 30. In assembly, the soldering tip 26 is inserted into the forward end of the ceramic heater tube; then the retaining sleeve 28 is disposed over the tip 26 and the length of the metal shroud 52 until its flange 76 is axially juxtaposed near the front end of the bushing 54 over which and against retaining shoulder 62 the skirt 34 and o-ring 64 have been placed; then the retainer nut 30 is slid over the metal sleeve and threaded snugly over the threads 66 to draw the end 74 of the sleeve tightly against retaining collar 72 of the tip 26 and compress it against the forward end of the metal shroud 52. The unit, thusly assembled is then ready to be attached to the hollow handle 32 utilizing the outer handle skirt 34 as the fastener.

Referring to FIG. 3, the rear portions of the heating element assembly 44 are shown in elevation as is the major portion of the hollow handle 32, the outer handle skirt 34 being shown in section for clarity. The rearwardly exposed retaining shoulder 60 on the bushing 54 in this view to be formed with notches 78 which mate with similar tabs 80 in the forward end of the hollow handle 32. Thus, the rear cylindrical body portion of the bushing 54 fits within the hollow forward end of the handle 32; and the notches 78 and tabs 80 mesh to provide an angular interlocking of the two units.

To hold the two units axially together, the handle skirt 34 is provided with a forward end wall 82 which is closed, or extends radially inwardly, to a diameter slightly larger than that of the forward body of the bushing 54 and its threads 66. The same forward end wall may also desireably be extended outwardly to form a flange 84 against which the operator's fingers may be placed for comfort and safety during soldering tool use. The radially wide flange 84 also serves as a protecting tool rest when the soldering tool is laid on a bench top.

A pair of retainer tabs 36 are formed to project from the outer surface of the hollow body 32. A cooperating set of retaining slots 38 are formed in the skirt 34 so that when the skirt is placed over the heating element bushing 54 against the o-ring 64, the slots 38 and tabs 36 may be interlocked to hold compressively the hollow handle 32 firmly against the heating element assembly 44. As indicated in the sectional view of FIG. 4, this interlocking action is facilitated by applying finger pressure according to the arrows 86 which deflects the skirt and causes the slot portions to move radially outwardly to provide clearance over the tabs 36 and then locking engagement therewith when the force is released. When the tabs and slots are so engaged, as set of larger shoulders 39 formed on the tabs 36 bears against the inner surface of the skirt 34 to space it, as shown, from the outer surface of the body 32. FIG. 4 also shows the power cord 14 in section having power leads 50 and a "ground" conductor 51 therein. A cord strain relief element 88 is also shown for protecting the cord 14 and its connections within the handle 32 against inadvertent pulling.

To be particularly noted in connection with those features depicted in FIG. 3 is the very restricted thermal path between the heating element assembly 44 and the handle skirt 34: heat must travel through the o-ring and the thin forward wall 82 or through the small retainer tabs 36 in order to reach the thin-walled hollow cylindrical body of the skirt which otherwise is separated from the hollow handle 32 and bushing 54 by the annular air gap 89 as indicated. Some convection cooling of the skirt 34 may be achieved, if desired, by venting the skirt with vent holes 91 near the forward portion of the hollow cylindrical body of the skirt.

To reduce further the temperature of the bushing 54 and the other rear portions of the heating assembly 44, the thermally conductive stub 55 is connected to a relatively heavy, copper "ground" connector 51 in the power cord 14. Thus heat at the bushing end of the assembly is drawn away and dissipated along the length of the power cord. It should be noted that the tip retaining sleeve 28 is preferably made of thin stainless steel and is thereby, like the metal shroud 52 and the ceramic tube 46, a poor thermal conductor.

An alternative heat extractor is illustrated in FIG. 5 in which the power cord 14A includes a braided copper outer shield 90 which may or may not be connected to the thermally conductive stub 55 and packed through an access tube 57, shown as it is placed by a temporary support, not shown, within the rear end portion of the ceramic tube 46, before securing the unit with the potting resin. The braided shield is then normally inserted through the access tube 57 after the potting resin is applied.

There have been disclosed and described an example of the invention which achieves the objects and exhibits the advantages set forth hereinabove.

We claim:

1. Hand held soldering instrument comprising: a heating element assembly having a front end portion carrying a soldering tip and a rear, base end, handle engaging portion, an enlarged diameter portion on said heating element assembly being disposed forwardly contiguously to said handle engaging portion forming a forwardly exposed, first retaining shoulder;

a handle element disposed rearwardly of said heating element assembly with its forward end disposed against said handle engaging portion;

an outer skirt element disposed concentrically over the base end portion of said heating element assembly and the forward portion of said handle element and having an inner diameter larger than said handle element thereby defining an annular, insulating space therebetween, the forward end of said outer skirt element being partially closed to form a reduced diameter collar engaging said forwardly exposed first retaining shoulder of said heating element assembly and rearwardly biasing said handle engaging portion toward the forward end of said handle element; and axially disposed latching means carried by the rear portion of said outer skirt element and said handle element removably, axially compressively locking together said handle element and said heating element assembly.

2. A soldering instrument as set forth in claim 1 wherein said axially disposed latching means comprise locking tabs projecting outwardly from said handle element and locking slots to mate therewith formed in the rear portion of said outer skirt element.

3. The invention as set forth in claim 1 which includes an elastomeric O-ring disposed compressively between said first retaining shoulder and said reduced diameter collar of said forward end of said skirt element.

4. The invention as set forth in claim 1 in which said heater element assembly includes a hollow ceramic tube and a resistive heater formed integrally with the forward end thereof.

5. The invention as set forth in claim 4 which further includes a protective metal sleeve closely disposed over said ceramic tube.

6. The invention as set forth in claim 5 which further includes a power cord having two power conductors and a heavy ground conductor and in which said ground conductor is thermally connected to the base end of said protective metal sleeve.

7. The invention as set forth in claim 6 which further includes a power control module disposed along said power cord remotely from said handle element.

8. The invention as set forth in claim 7 in which said control module is of the character to sense the resistance of said heater during the inflection point of the applied AC power and control the magnitude of power supplied to said heater responsive to said resistance.

9. The invention as set forth in claim 8 in which said module includes male plug-in means for power connection thereto and mechanical support thereof.

10. The invention as set forth in claim 1 which further includes angularly disposed interlocking means disposed on said forward end of said handle element and said rear, handle engaging portion of said heating element assembly.

11. The invention as set forth in claim 1 which further includes a thermally insulative sleeve disposed over the outer surface of said skirt element.

* * * * *